United States Patent Office 3,729,306
Patented Apr. 24, 1973

3,729,306
PURIFICATION OF RARE-EARTH METALS
Thomas A. Henrie and James Eugene Murphy, Reno, Nev., assignors to the United States of America as represented by the Secretary of the Interior
Filed Apr. 28, 1969, Ser. No. 819,830
Int. Cl. B01j 17/10; C22d 7/04, 9/00
U.S. Cl. 75—10                                           4 Claims

ABSTRACT OF THE DISCLOSURE

Rare-earth metals are purified and alloys are separated into component metals by electrical field freezing under conditions providing a small thermal gradient and a temperature of the liquid portion of the specimen near the melting point of the metal.

---

Figure 1:
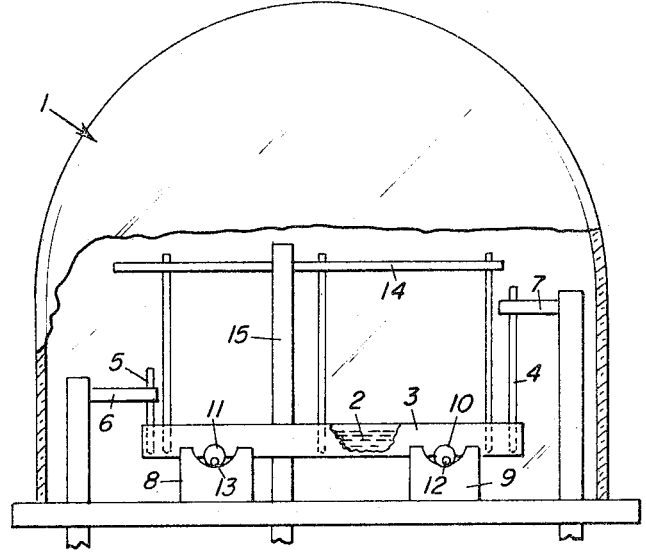

This invention relates to the production of rare-earth metals such as cerium, lanthanum, praseodymium, neodymium, yttrium, etc. in a state of high purity. These metals have various applications such as use as an alloying metal for high-strength permanent magnets.

Some of the rare-earth metals are, however, difficult to prepare by conventional means, such as electrowinning, because of their relatively high melting points and because in the molten state they react with most materials. However, by preparing an alloy of the rare earth and a suitable metal, such as iron, nickel, or cobalt, the melting point of the electrowon product can be reduced substantially. At the lower temperature, the product is easily electrowon and has a very small interstitial impurity content. For this reason, electrowinning of the alloy to produce a high-purity metal with respect to other elements is a relatively simple process. Removal of the alloying metal from the product, however, is often not possible by any of the methods used in the past for refining rare earths. In addition, it is sometimes desirable to increase the purity of those rare-earth metals which can be electrowon as individual metals.

Electrotransport, i.e., the application of an electric field to a solid or liquid metal alloy to cause redistribution of the component elements, has been the subject of many investigations. A general review of its experimental and theoretical aspects is given in an article entitled "Electrotransport as a Means of Purifying Metals" by J. D. Verhoeven, in Journal of Metals, January, 1966. Progressive solidification of a metal, commonly referred to as normal freezing, also causes a redistribution of solute. The redistribution of solute upon solidification is the basis for zone refining.

The combination of electrotransport and normal freezing, designated as electrical field freezing, previously was studied in several alloy systems. Previous investigators have shown that field freezing can be much more effective than normal freezing alone as a means of separating alloy components in samples of capillary size. A disadvantage, however, is that only very small quantities of alloys can be processed in capillary tubing. Also, the number of metals that can be purified is limited because capillary tubing of suitable refractory material is often not available.

It has now been found, according to the present invention, that the disadvantages of the prior art processes can be largely overcome by employing certain essential process conditions. These process conditions are (1) maintenance of a small thermal gradient and (2) maintenance of the temperature of the liquid portion of the alloy near the melting point of the alloy. Use of these process conditions has been found to minimize convection and back diffusion and to enable treatment of a comparatively large-size sample, e.g., of about ½ inch diameter, to obtain a high-purity product.

In the process of the invention all heating of the sample is a result of the joule heating from the direct current applied to the sample. This is in contrast to the procedures employed in zone refining, or in prior art combinations of zone refining and electrotransport, in which heat is supplied by an external source. The sample is electrolyzed while being maintained in a viscouse state with both solid and liquid phases present. In the rare-earth metals, impurities normally concentrate at the anode. Good purification may be obtained on metals having melting points varying from about 600° C. to 1550° C. and with samples as large as ½ inch in diameter.

In the process of the invention, the sample is initially placed in a suitable inert container, such as a tantalum boat, in contact with electrodes of an inert material, such as molybdenum or tungsten, and a direct current electric field is applied. The current is increased until the specimen is completely molten, and is then slowly reduced to the point where the specimen just begins to solidify. The anode is also maintained at a temperature slightly higher than that of the bulk of the sample, thereby causing a small thermal gradient to exist. As a result of this thermal gradient, initial solidification takes place adjacent to the cathode. Although optimum values of this thermal gradient will vary considerably, depending on the identity of the rare-earth metal and the type and amount of impurities present, the concentrations of the impurities in the metal, the desired purity of the final product, etc., suitable values of thermal gradient at the interface between the solid and the liquid will vary from about 1° C./cm. to about 10° C./cm., preferably from about 1° C./cm. to about 5° C./cm.

As the current is further reduced, solidification, i.e., freezing of the specimen, proceeds in the direction of the anode. The freezing rate will depend upon the velocities of electrotransport of the impurities or alloying component and can be determined experimentally. However, a freezing rate of about 0.1 cm./hr. to about 10 cm./hr. is generally suitable, with a range of about 1.5 cm./hr. to about 0.15 cm./hr. being preferred.

In the electrical field of the applied direct current, the impurities generally migrate in the direction of the anode. At the percentage of alloying metal is increased the melting point of the alloy may change, thus making readjustment of the anode temperature necessary in order to maintain the required temperature gradient and keep the sample partly molten.

As discussed above, maximum purification requires that the temperature of the liquid portion be maintained near the melting point of the metal. Again, optimum values of the temperature are best determined experimentally. However, temperatures within about 1 to about 25° C., preferably within about 5° C., of the melting point of the metal give good results.

A suitable apparatus for use in the process of the invention is illustrated in FIG. 1 discussed below. This apparatus is, however, conventional, and many possible modifications will be apparent to those skilled in the art. Referring to the drawing, the experimental apparatus is enclosed in a Pyrex bell jar 1 which can be maintained at a vacuum of $10^{-6}$ torr at the experimental temperatures. The sample 2 is contained in horizontal boat 3. Electrodes 4 and 5 serve to transmit the electric current to sample 2. The electrical resistance of the electrodes is greater than that of the sample because their diameter is relatively small. Thus, more heat is produced in the electrodes by the electric current. These electrodes are connected to water-cooled (not shown in drawing) bus bars 6 and 7 by means of which the electrode temperature can be controlled by moving the bus bars vertically relative to the electrode. Boat 3 is supported by means of supports 8 and 9, Pyrex insulators 10 and 11 which serve to keep the specimen electrically isolated from the base plate, and tungsten support rods 12 and 13 which serve to hold the boat in place. Thermocouple 14 and movable support 15, therefore, provide means for measuring the temperature of the sample at different points.

The following example will serve to more particularly illustrate the invention.

EXAMPLE

This example consists of a series of experiments demonstrating the superior results achieved when the liquid portion of the specimen is maintained near the melting point of the metal and when a small thermal gradient is employed. A cerium-rich alloy was used in these experiments. The apparatus used was that discussed above. The boat used was 12.7 cm. long with a 1.25-cm. inside diameter and was fabricated from 0.005-inch-thick tantalum tubing. The electrodes were tungsten, 0.1 inch in diameter, connected to water-cooled copper bus bars adjusted to maintain a thermal gradient at the interface of between 5° C./cm. and 10° C./cm. Direct current was supplied by a continuous control, 500-ampere rectifier with less than 5 percent ripple.

Purities of the cerium and iron used in this study were 99.8 and 99.9 percent, respectively. The cerium and iron, including some $Fe^{59}$ tracer, required to prepare a cerium-12.5-atomic percent iron alloy were arc-melted into a bar in a water-cooled copper mold. The bar, weighing 90 grams, was placed in the tantalum boat, and the ends were connected to the tungsten electrodes.

To insure even distribution of the iron before an experiment, the bar was heated under a vacuum of less than $5 \times 10^{-6}$ torr to approximately 200° C. above the liquidus point for one-half hour or longer. Small speaks on the alloy surface, presumably cerium oxide, moved rapidly in smal circular paths, thus indicating that convective mixing was taking place. When the current was reduced so that the sample was just above the melting point, movement of the surface particles stopped as the alloy became viscous.

Temperature measurements were made by inserting tantalum-sheathed Chromel-Alumel thermocouples directly into the molten alloy. The thermocouples were withdrawn before the alloy solidified. The temperatures of the tungsten electrodes were controlled by placement of the copper connectors. Placing the connectors further away from the melt made the electrodes hotter.

After completion of an experiment, the sample was analyzed for iron by a radiotracer technique. A ½-inch-long segment of the alloy bar was shielded from the remainder of the bar with 4 inches of lead, and a gamma-ray spectrometer was used to determine the radioactivity of this segment. This procedure was repeated until all of the bar had been analyzed. Comparison of these results with those obtained by cutting the bar into individual segments and analyzing each segment by radiotracer and chemical analysis showed good agreement.

The duration of the experiments was between 8.5 and 85 hours, which corresponded to freezing rates from 1.5 cm./hr. to 0.15 cm./hr. The average field intensity was 0.040 v./cm.; the corresponding current density was 240 amp./cm.². The data were plotted as the ratio of $C_s$ to $C_0$ along the length of the specimen, where $C_s$ is the concentration of iron (solute) after solidification and $C_0$ is the original concentration of iron. Results are shown in FIG. 2.

Figure 2:
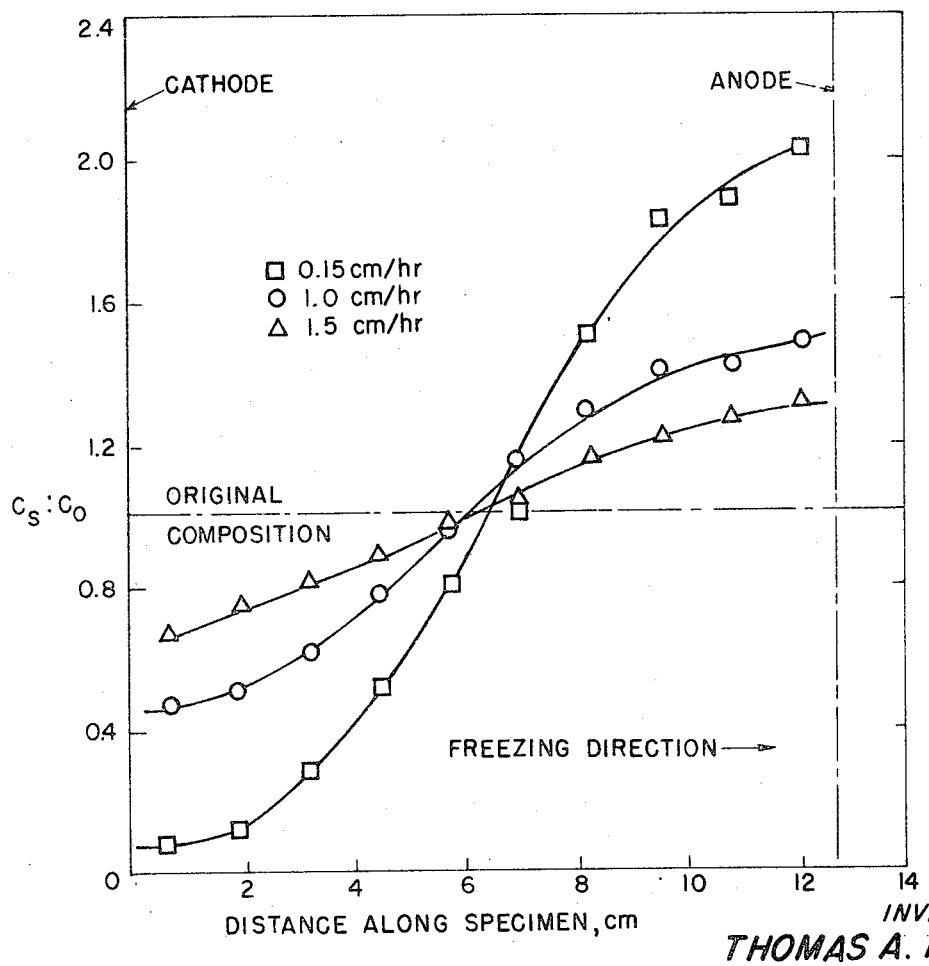

As seen from the data plotted in FIG. 2, good separation of the alloy constituents was obtained under the experimental conditions, particularly with the slower freezing rates. For example, with a field freezing rate of 0.15 cm./hr. the 2-cm. segments of the alloy bar next to the cathode and anode contained approximately 1.1 and 25.0 percent iron, respectively.

Other experiments have shown that the method of the invention is equally as effective for the removal of small amounts of impurities, particularly from the rare earths cerium, lanthanum, and yttrium. In general, the invention should be useful in the purification of any metal when the impurities in the metal can be moved by electrotransport. Such metals additionally include neodymium, praseodymium, and gadolinium. The invention can also be employed to separate alloy components, but it is generally most useful as a purification technique.

What is claimed is:

1. A method for the purification of rare-earth metals or the separation of rare-earth metal from an alloy containing the rare-earth metal comprising: (1) applying to the rare-earth metal or alloy sample a direct current of sufficient magnitude to completely melt the sample, (2) reducing the current to the point where the sample begins to solidify, (3) simultaneously maintaining the anode at a temperature higher than the bulk of the sample in order to provide a thermal gradient at the solid-liquid interface of the sample of about 1°. to 10° C. per centimeter, and to maintain the temperature of the liquid portion of the sample within about 1 to 25° C. of the melting point of the sample, and (4) further reducing the current to cause solidification of the sample to proceed in the direction of the anode, thereby effecting said purification or separation by means of a combination of electrotransport and zone refining.

2. The method of claim 1 in which the current is adjusted to provide a solidification rate of the molten sample of about 0.15 to 1.5 centimeters per hour.

3. The method of claim 4 in which the heat required to maintain the alloy at the proper temperature is derived solely from the applied D.C. current.

4. The method of claim 4 in which the rare-earth metal is cerium, lanthanum or yttrium.

References Cited

UNITED STATES PATENTS

| | | | |
|---|---|---|---|
| 1,793,672 | 2/1931 | Bridgman | 164—60 |
| 2,131,062 | 9/1938 | McBride | 75—65 |
| 2,801,192 | 7/1957 | Overby | 148—1 |
| 2,835,612 | 5/1958 | Taylor | 75—10 |
| 2,848,315 | 8/1958 | Kieffer | 75—10 |
| 3,036,898 | 5/1962 | Brock | 75—10 |
| 3,046,164 | 7/1962 | Domenicali | 75—10 |
| 3,086,857 | 4/1963 | Pfann | 75—10 |
| 3,131,051 | 4/1964 | Hawks | 75—10 |

FOREIGN PATENTS

| | | | |
|---|---|---|---|
| 985,253 | 3/1965 | United Kingdom | 75—84 |
| 375,304 | 1932 | United Kingdom | 75—10 |

HYLAND BIZOT, Primary Examiner

P. D. ROSENBERG, Assistant Examiner

U.S. Cl. X.R.

75—65; 148—1.6